(12) United States Patent
Baldini

(10) Patent No.: US 10,806,083 B2
(45) Date of Patent: Oct. 20, 2020

(54) UNIT FOR CONVEYING AGRICULTURAL PRODUCTS

(71) Applicant: KVERNELAND GROUP RAVENNA S.R.L., Russi (IT)

(72) Inventor: Massimo Baldini, Ravenna (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 86 days.

(21) Appl. No.: 16/092,709

(22) PCT Filed: Apr. 4, 2017

(86) PCT No.: PCT/EP2017/057920
§ 371 (c)(1),
(2) Date: Oct. 10, 2018

(87) PCT Pub. No.: WO2017/178273
PCT Pub. Date: Oct. 19, 2017

(65) Prior Publication Data
US 2019/0124847 A1    May 2, 2019

(30) Foreign Application Priority Data
Apr. 11, 2016 (EP) ..................... 16425031

(51) Int. Cl.
*A01D 89/00* (2006.01)
*A01F 15/10* (2006.01)

(52) U.S. Cl.
CPC .......... *A01D 89/002* (2013.01); *A01F 15/106* (2013.01); *A01D 89/008* (2013.01)

(58) Field of Classification Search
CPC .... A01D 89/002; A01D 89/00; A01D 89/001; A01D 89/008; A01D 61/008; A01F 2015/102; A01F 15/106; A01F 15/10
See application file for complete search history.

(56) References Cited

U.S. PATENT DOCUMENTS 5,848,523 A * 12/1998 Engel ................... A01D 89/008
56/341
6,279,304 B1 * 8/2001 Anstey .................. A01F 15/106
198/676

(Continued)

FOREIGN PATENT DOCUMENTS

| EP | 0064112 A1 | 11/1982 |
|---|---|---|
| EP | 1097629 A1 | 5/2001 |
| EP | 1163836 A1 | 12/2001 |

*Primary Examiner* — Alicia Torres
*Assistant Examiner* — Adam J Behrens
(74) *Attorney, Agent, or Firm* — Dennemeyer & Associates, LLC

(57) ABSTRACT

A unit for conveying agricultural products including a device (3) for conveying agricultural products picked up by an apparatus (2) toward an inlet to a chamber (102) of an agricultural machine (100). The device (3) includes a main rotating shaft (4) facing the apparatus (2) and a plurality of teeth (5), and an auger (6). The auger (6) includes an auxiliary rotating shaft (7) facing the apparatus (2) and contiguous and substantially coaxial to the main shaft (4). A screw (8) is wound around the auxiliary shaft (7) to push the agricultural products toward the teeth (5). Each stem of a series of stems (9) is interposed between a first surface (8a) of the screw (8) and an inner end (7a) of the auxiliary shaft (7), for facilitated movement of the agricultural products propelled by the auger (6) toward the teeth (5).

11 Claims, 6 Drawing Sheets

(56) References Cited

U.S. PATENT DOCUMENTS

| | | | | |
|---|---|---|---|---|
| 6,370,856 B1* | 4/2002 | Engel | ................ | A01D 90/02 |
| | | | | 56/341 |
| 6,874,311 B2* | 4/2005 | Lucand | ................ | A01F 15/106 |
| | | | | 56/341 |
| 7,694,504 B1* | 4/2010 | Viaud | ................ | A01D 90/04 |
| | | | | 56/341 |
| 8,056,314 B1* | 11/2011 | Anstey | ................ | A01F 15/106 |
| | | | | 56/364 |
| 8,205,424 B1* | 6/2012 | Lang | ................ | A01D 90/04 |
| | | | | 56/341 |
| 8,381,503 B2* | 2/2013 | Roberge | ................ | A01F 15/106 |
| | | | | 56/341 |
| 8,813,466 B2* | 8/2014 | Van De Weijer | ...... | A01D 90/04 |
| | | | | 56/341 |
| 8,959,883 B2* | 2/2015 | McClure | ................ | A01F 15/10 |
| | | | | 56/341 |
| 10,039,237 B2* | 8/2018 | Smith | ................ | A01F 15/10 |
| 10,405,496 B2* | 9/2019 | Van Den Wildenberg | ................ | A01F 15/07 |

\* cited by examiner

UNIT FOR CONVEYING AGRICULTURAL PRODUCTS

CROSS-REFERENCE TO RELATED APPLICATIONS

This is a 35 U.S.C. 371 National Stage Patent Application of International Application No. PCT/EP2017/057920, filed Apr. 4, 2017, which claims priority to European application 16425031.8, filed Apr. 11, 2016, each of which is hereby incorporated by reference in its entirety.

The present invention relates to a unit for conveying agricultural products.

According to methods that are by now well-established, agricultural products such as grass, wheat, corn, hay, forage and the like are first cut and then redistributed on the ground in one or more rows, also known as swaths, so that they can be subsequently compacted into bales of various shapes and sizes.

This activity is often entrusted to agricultural machines known as "balers" or "hay balers", among which a widely used type is certainly "round balers", which produce cylindrical bales.

These machines move along the ground of interest, following the trajectory defined ideally by the swaths, and progressively pick up the agricultural products that they encounter, indeed conveying them into a compression chamber with which they are provided. The chamber is provided with elements that are arranged along the perimeter of the internal compartment of the chamber (such as rollers, belts or chains) in order to entrain and compress said products, thus causing the forming of the bale.

In these machines, picking up the products from the ground is entrusted to a pick-up apparatus, which comprises a first rotating shaft, which is parallel and proximate to the ground and is provided with various rows of prongs (metal rods) indeed capable of lifting the agricultural products.

Behind the pick-up apparatus, the agricultural products are affected by the action of a plurality of teeth, which rotate integrally with a second shaft that is parallel to the first one. The teeth face the inlet of the compression chamber and are capable of directing the agricultural products toward it.

The transverse extension of the row of prongs is usually larger than that of the plurality of teeth.

The transverse space occupation of the teeth must in fact correspond to the transverse dimension of the inlet of the chamber, which in turn is limited by specific technological constraints. Vice versa, by increasing the transverse extension of the row of pick-up prongs it is possible to increase the width of the strip of ground affected by the prongs at each pass, reducing the overall time required for pick-up.

In this manner, however, there are no teeth behind the outer prongs.

The need therefore arises to provide a further refinement, in order to allow the agricultural products raised at the outer prongs to be still conveyed toward the bale forming chamber.

More specifically, according to known methods, this refinement consists in arranging behind the outer prongs two augers which are coaxial to the shaft around which the teeth rotate.

These augers in fact have the task of propelling the agricultural products raised and received by the outer prongs toward the teeth and therefore toward the bale forming chamber.

However, this constructive solution is not devoid of drawbacks.

Sometimes the agricultural products propelled by the augers in fact strike the lateral surface of the first tooth and are unable to move beyond it and indeed often end up being entangled or in any case attached thereto.

In this unwanted case, the agricultural products that are subsequently moved by the auger end up accumulating on the initial ones, forming a tangle that prevents advancement toward the chamber and inhibits the correct operation of the system.

When this occurs, the operator has no choice but to stop the machine temporarily, climb down from his/her post and remove the tangle manually, with obvious inconvenience and most of all an unacceptable delay in the pick-up operations.

The aim of the present invention is to solve the problems described above, by providing a unit that is capable of ensuring optimal conveyance of the agricultural products toward the bale forming chamber.

Within this aim, an object of the invention is to provide an agricultural machine that is capable of ensuring optimum conveyance of the agricultural products towards the bale forming chamber.

Another object of the invention is to provide a unit (and a machine) that ensures effective modes of conveyance of the agricultural products towards the bale forming chamber, avoiding or at least limiting the danger of unwanted accumulations of material.

Another object of the invention is to provide a unit that ensures high reliability in operation.

Another object of the invention is to devise a unit that adopts a technical and structural architecture that is alternative to those of units of the known type.

Another object of the invention is to provide a unit and a machine that have low costs, are safe in application and can be obtained easily starting from commonly commercially available elements and materials.

This aim and these and other objects that will become better apparent hereinafter achieved by a conveyance unit according to claim 1 and by an agricultural machine according to claim 11.

Further characteristics and advantages of the invention will become better apparent from the description of a preferred not exclusive embodiment of the unit according to the invention, illustrated by way of nonlimiting example in the accompanying drawings, wherein.

Figure 1:
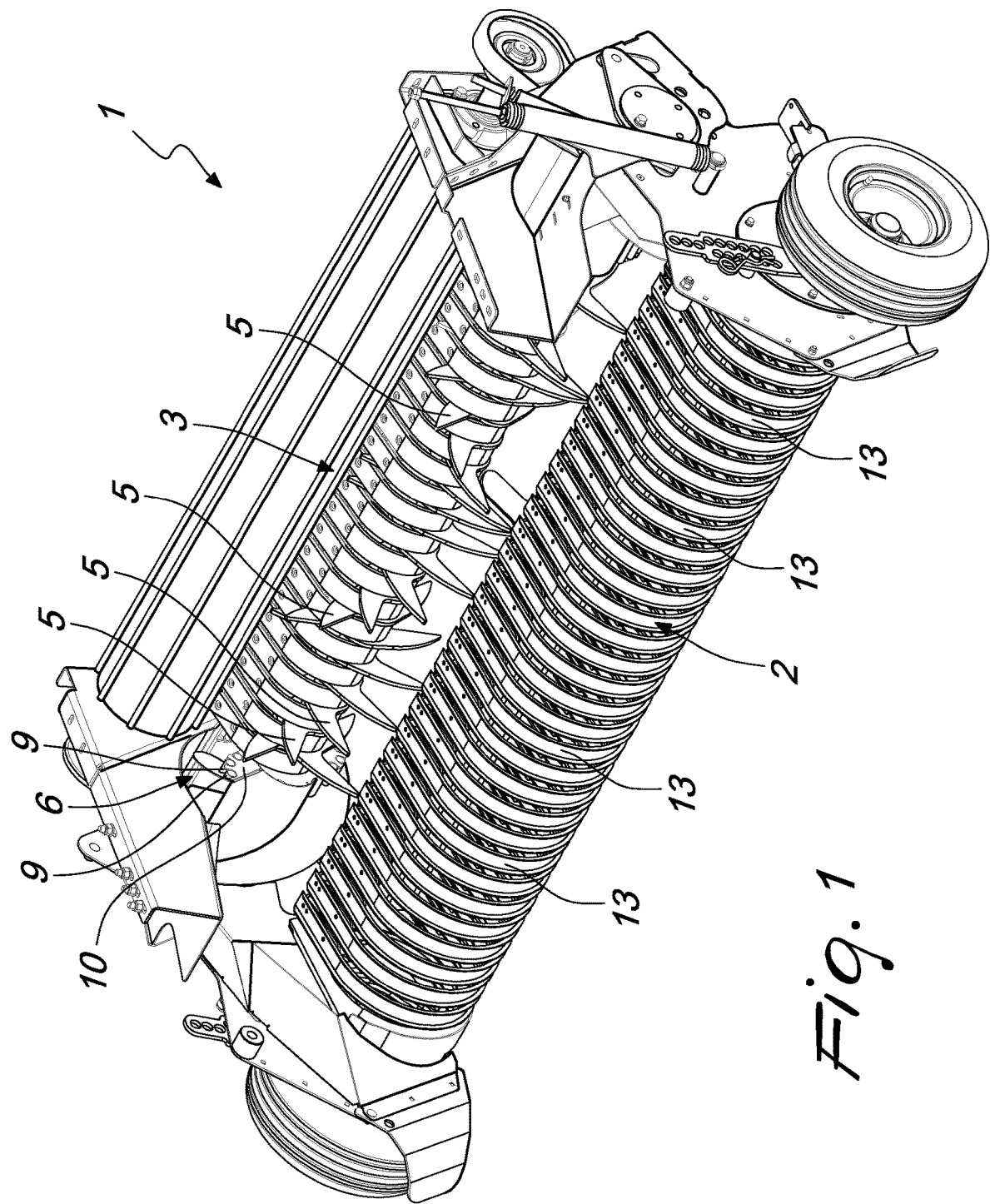
FIG. 1 is a perspective view of the conveyance unit according to the invention.
Figure 2:
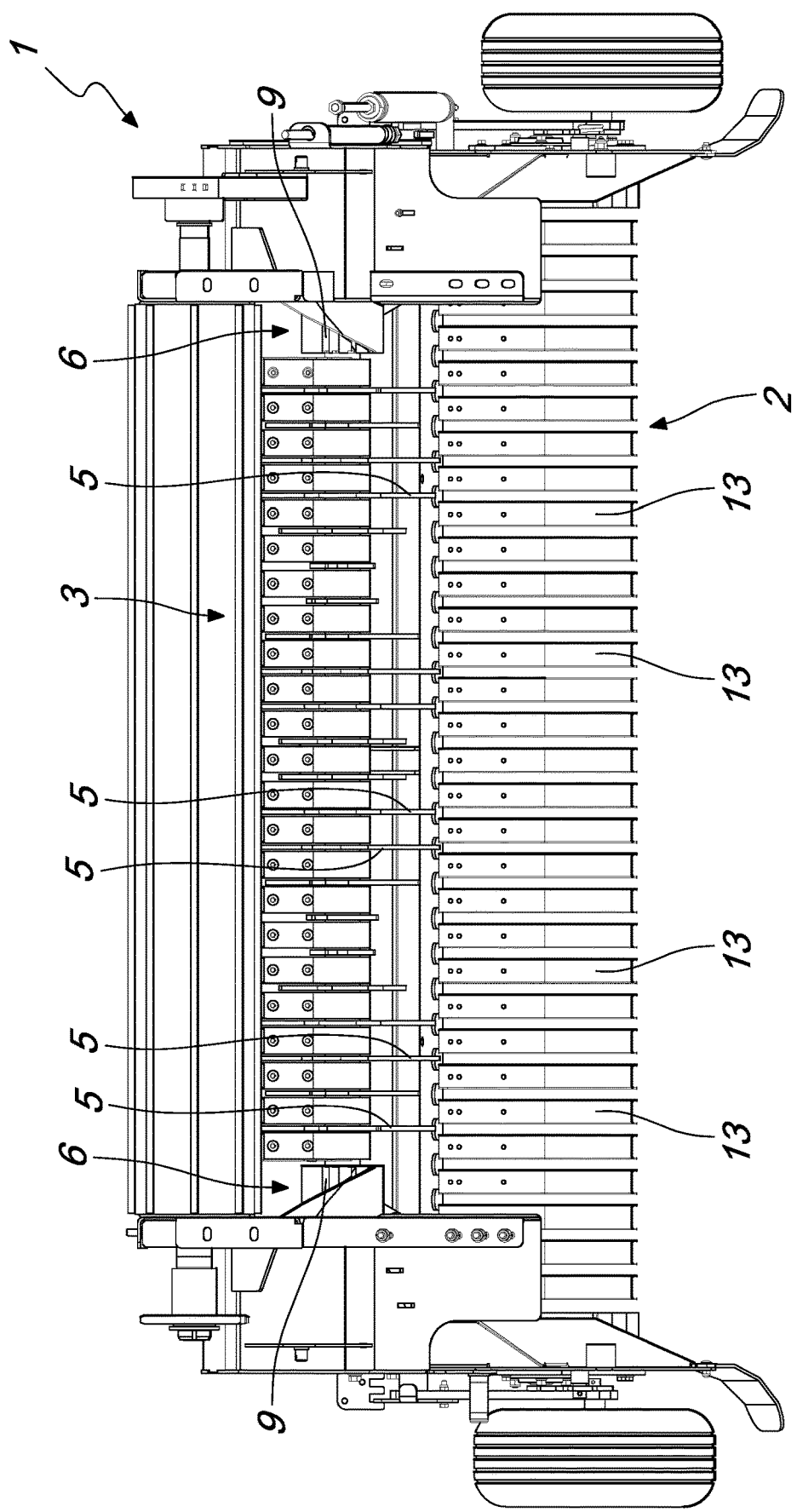
FIG. 2 is a front elevation view of the conveyance unit of FIG. 2.

With particular reference to the figures, the reference numeral 1 generally designates a conveyance unit for agricultural products, such as grass, hay, forage, wheat, corn and the like, previously cut and distributed on the ground randomly or, preferably, in an ordered manner (along rows known as "swaths").

The unit 1 is preferably intended to be part of an agricultural machine 100 or to work for it, wherein the machine 100 is of the type of a baler, a round baler and the like, which is in any case intended to travel over the agricultural ground (independently or towed by means of a respective tow bar 101 by a respective tractor) to pick up the agricultural products cut previously and form a bale with them.

In any case, the use of the unit 1 also for different purposes and/or for different types of agricultural products and machines 100, according to the specific requirements, is not excluded, without thereby abandoning the protective scope claimed herein.

The unit 1 comprises at least one apparatus 2 for picking up the previously cut agricultural products, of which the description of a possible embodiment, which does not limit the application of the invention, will be provided in the pages hereinafter.

Furthermore, the unit 1 comprises at least one device 3 for conveying the agricultural products picked up by the apparatus 2 toward an inlet to the chamber 102 that is comprised in the agricultural machine 100 and is preset to form the bale.

In practice, in other words, while the agricultural machine 100 advances along the ground, the apparatus 2 picks up the previously cut agricultural products that it encounters progressively, transferring them behind it, where the device 3 takes on the task (in the manner that will be described hereinafter) of conveying them toward the inlet of the chamber 102 (which in turn is arranged behind the device 3).

The chamber 102 is provided with elements (such as rollers, belts, chains or others), even of a known type, which are arranged for example along the perimeter of its internal compartment, in order to entrain and compress such products so as to obtain the forming of the bale, which can then be evacuated from an outlet in various manners.

Figure 4:
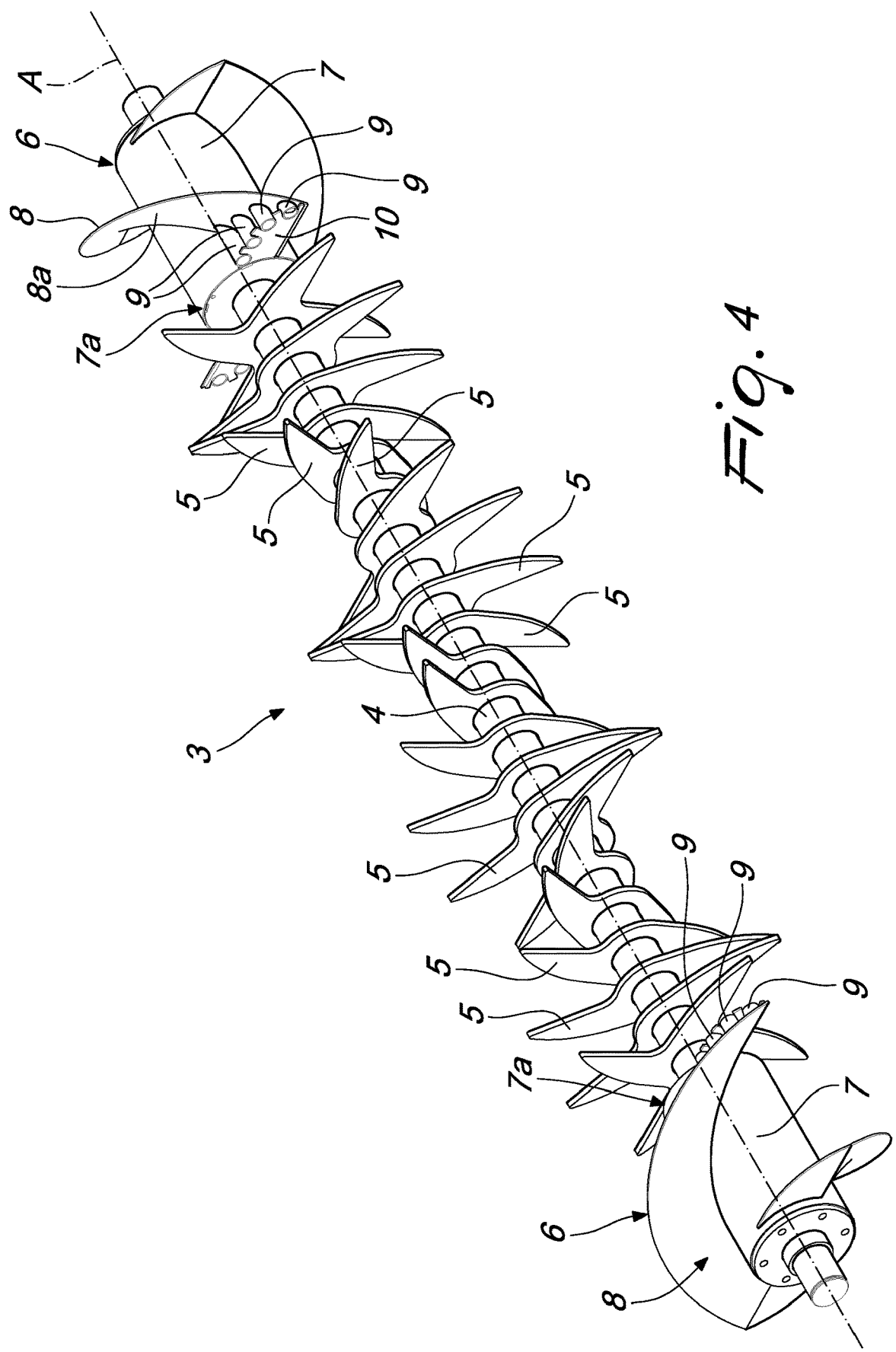
FIG. 4 is a perspective view of the conveyance device of the unit of FIG. 1.

As can be deduced from the accompanying figures, the device 3 comprises first of all a main rotating shaft 4 (see in particular FIG. 4), which faces the apparatus 2 and is provided with teeth 5 (which rotate integrally with the main shaft 4) capable of transferring the agricultural products to the chamber 102.

More precisely, the main shaft 4 and the teeth 5 face only a (preferably central) portion of the apparatus 2. The length of the main shaft 4 (or at least of its useful portion, in which the teeth 5 are distributed) is in fact limited in an upward region by the transverse extension of the inlet to the chamber 102, whereas usually for the apparatus 2 a greater transverse extension is chosen in order to be able to pick up agricultural products from the broadest possible strip of ground.

Therefore, indeed in order to be able to convey effectively also the agricultural products that are raised by the part of the apparatus 2 behind which the teeth 5 do not operate, the device 3 also comprises at least one auger 6, which in turn comprises an auxiliary rotating shaft 7, which faces the apparatus 2 and is contiguous and substantially coaxial to the main shaft 4, and a screw 8.

The expression "substantially coaxial" is to be understood in that the protection is extended also to units 1 in which the auxiliary shaft 7 is parallel and slightly offset with respect to the main shaft 4, with such components being sufficiently close to make it useful in any case to resort to the particularities of the invention.

The screw 8, which can be of the type with one or more starts, is wound around the auxiliary shaft 7 in order to be able to indeed propel toward the teeth 5 the agricultural products (indeed the ones that the teeth 5 would not otherwise be able to capture and convey toward the chamber 102).

Figure 3:
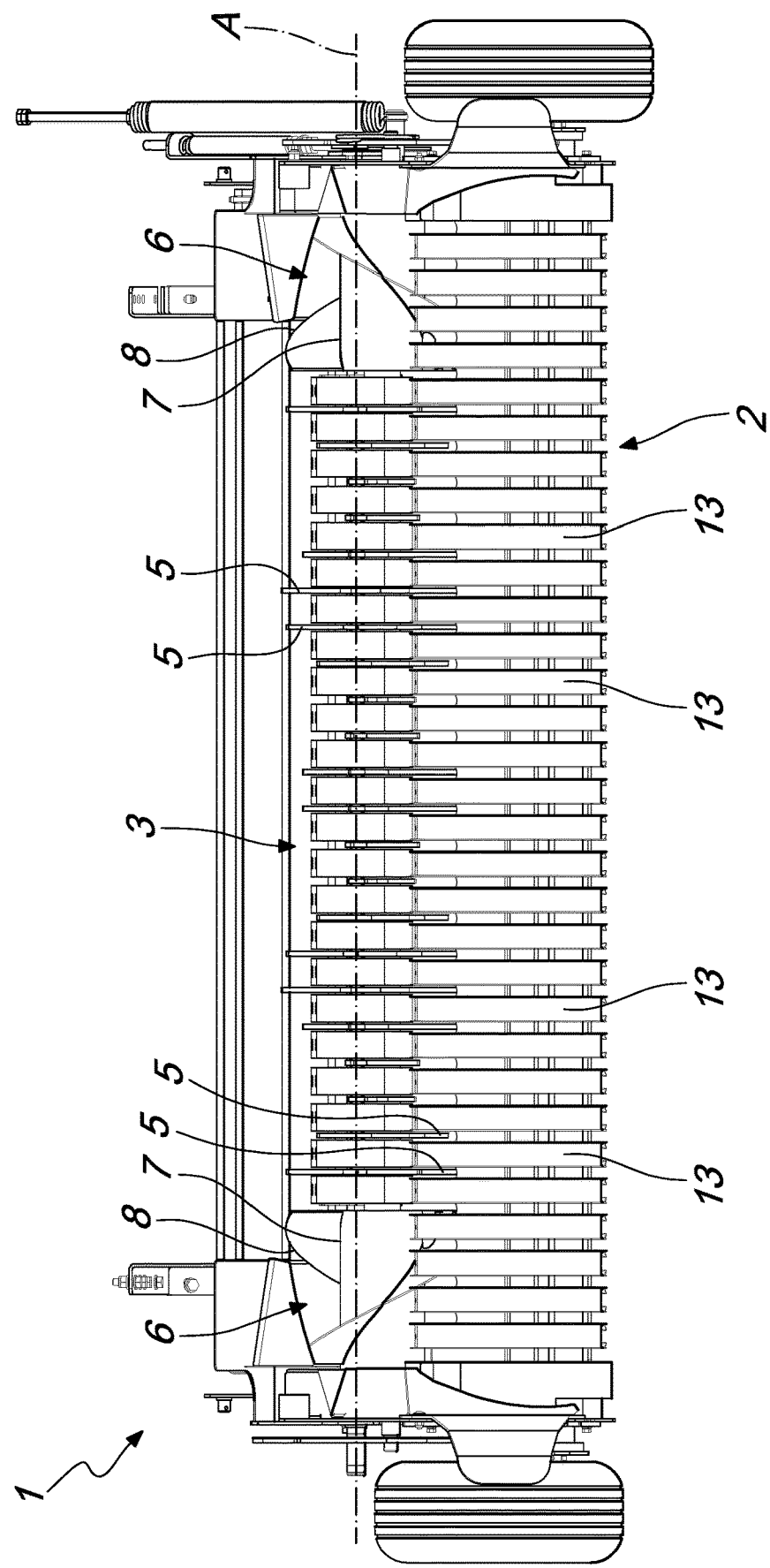
FIG. 3 is a front elevation view of the conveyance unit of FIG. 2, without some components in order to show the augers better.
Figure 8:
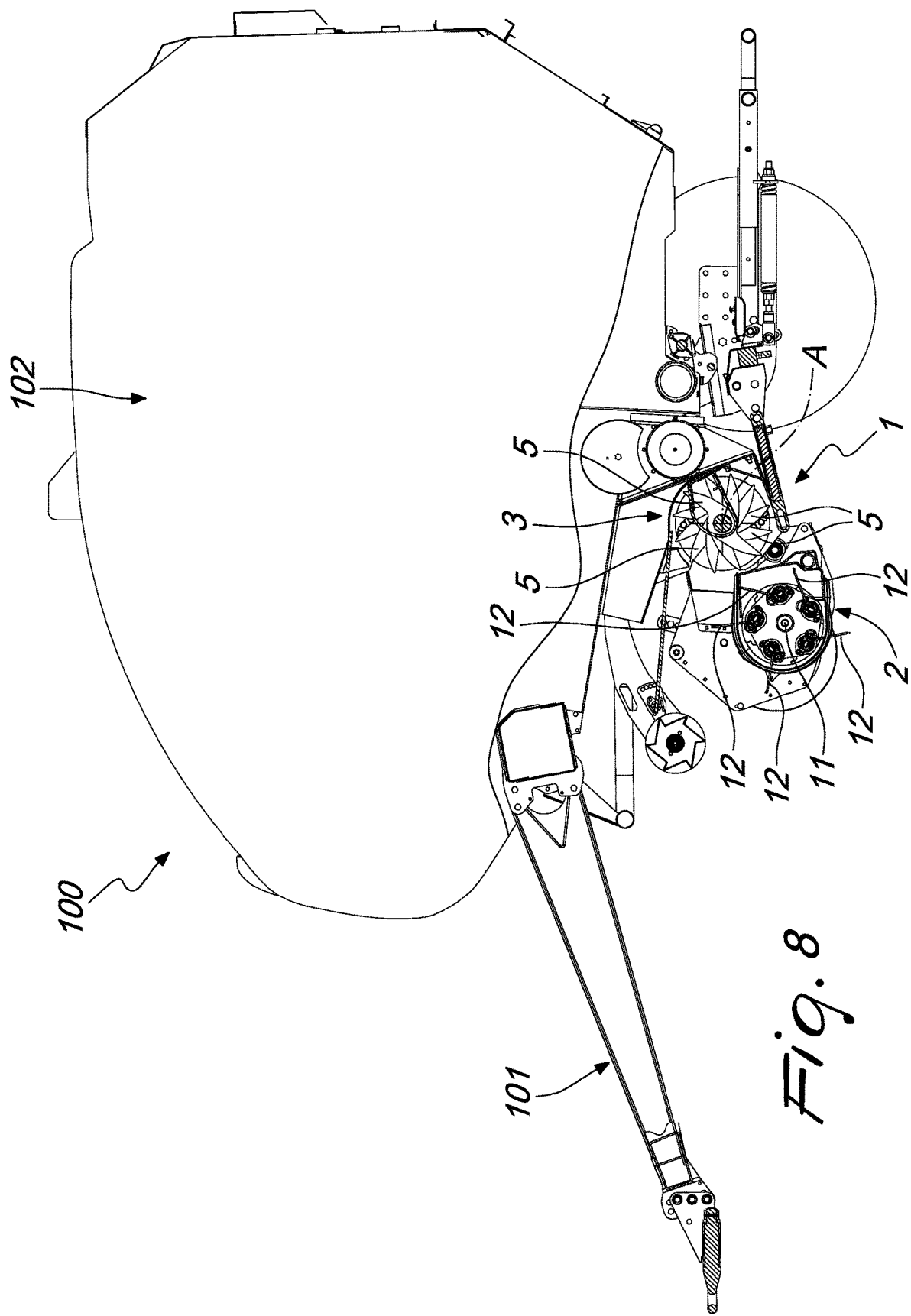
FIG. 8 is a schematic and partially sectional side elevation view of an agricultural machine provided with the conveyance unit according to the invention.

According to the invention, the device 3 comprises at least one series of stems 9 (preferably but not exclusively cylindrical ones), which are parallel to the auxiliary shaft 7 (and therefore evidently also to the main shaft 4), according to a center distance that increases progressively with respect to the longitudinal axis A that is defined (shared) by the auxiliary shaft 7 and by the main shaft 4 (shown for the sake of simplicity only in FIGS. 1, 3 and 8).

It is useful to specify that the protection is to be understood as extending also to constructive solutions in which the transverse cross-section of the stems 9 is solid and to constructive solutions in which the stems 9 instead have a substantially tubular shape and are therefore internally hollow.

Figure 5:
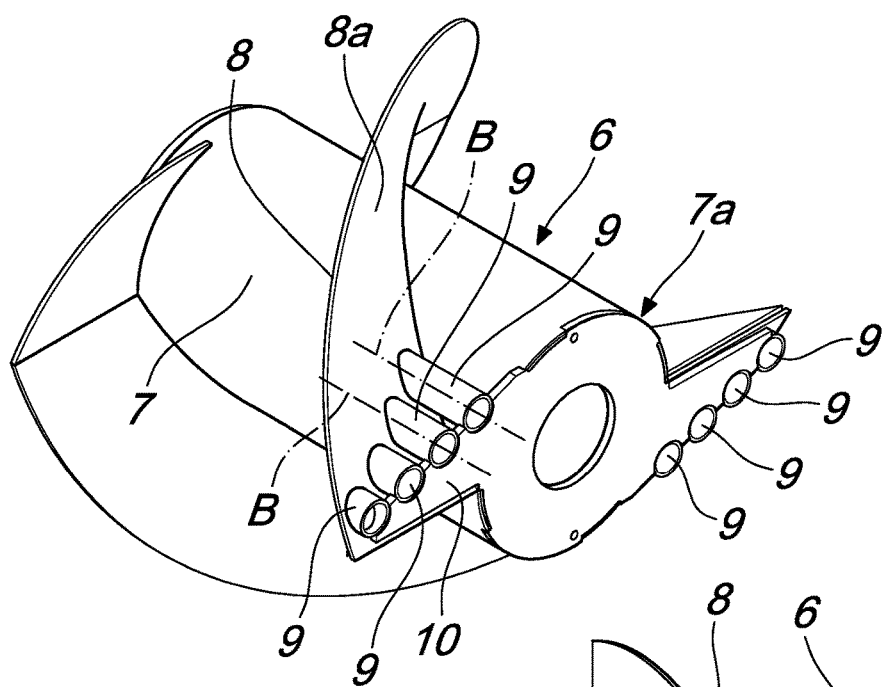
FIG. 5 is a perspective view of an auger and of the respective stems.
Figure 6:
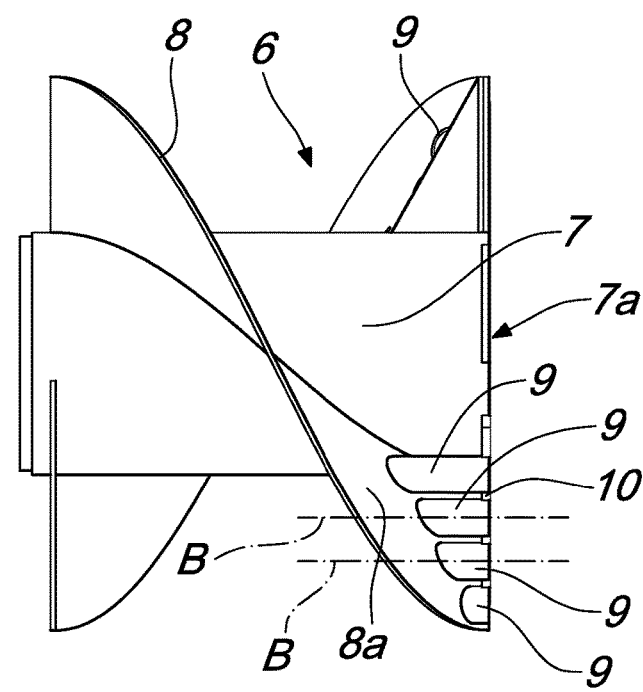
FIG. 6 is a front elevation view of the elements of FIG. 5.
Figure 7:
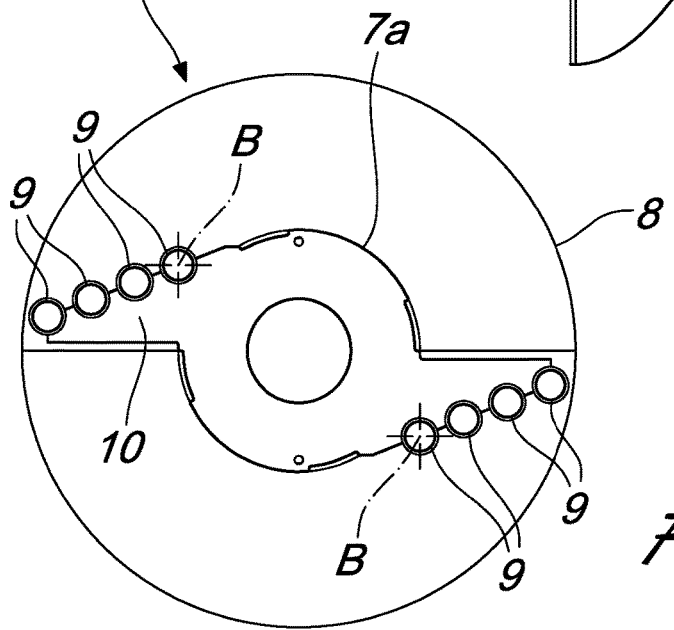
FIG. 7 is a side elevation view of the elements of FIG. 5.

As is further evident for example in FIGS. 5, 6 and 7, each stem 9 is interposed between the first turn of the screw 8, i.e., the turn that lies closest to the teeth 5 (possibly the only one), and the respective inner end 7a (FIGS. 4, 5, 6 and 7) of the auxiliary shaft 7.

Thus, the stems 9 ensure the facilitated movement of the agricultural products propelled by the auger 6 toward the teeth 5, since while the products indeed move toward them, they are forced to move away from the auxiliary shaft 7 by the stems 9, which behave like steps of a flight of stairs, preventing them from being able to stop against the first tooth 5, forming unwanted tangles.

In particular, since usually the main shaft 4 faces a central portion of the pick-up apparatus 2, which is therefore completed by two outer portions (which, for the reasons already pointed out, increase the pick-up capacity of the unit 1 but at the same time do not have respective teeth 5 behind them), the device 3 comprises two augers 6.

The two augers 6 are therefore arranged on opposite sides of the main shaft 4 and of the teeth 5, and each one of them faces a corresponding outer portion of the pick-up apparatus 2. A corresponding series of stems 9 is thus interposed between the first turn of each screw 8 and the respective inner end 7a of the corresponding auxiliary shaft 7.

Conveniently, in the preferred constructive solution (which is proposed by way of nonlimiting illustration in the accompanying figures, the first stem 9 in each auger 6, i.e., the one closest to the longitudinal axis A, is spaced from the respective auxiliary shaft 7 according to a predefined center distance which is greater than zero (i.e., it is not in contact with the auxiliary shaft 7 proper, although the provision of units 1 in which this occurs is not excluded).

Thus, between the first stem 9 and the auxiliary shaft 7 there is an interspace that is adapted to facilitate the optimum movement of the products and to limit the risk of the forming of tangles.

Furthermore, each stem 9 is (preferably but not exclusively) spaced from the adjacent stem 9 by a value greater than zero, so as to define corresponding gaps adapted to facilitate (like the interspace) the optimum handling of the products and limit further the risk of forming tangles.

In the preferred embodiment, shown in the accompanying figures by way of nonlimiting example of the application of the invention, a first end of each stem 9 is coupled to the lateral surface 8a of the first turn of the corresponding screw 8. Of course, such lateral surface 8a (indicated in FIGS. 4, 5, 6 and 7) is the one directed toward the teeth 5. On the opposite side, each stem 9 is supported by a contoured plate 10 (FIGS. 4, 5, 6 and 7), which is associated (anchored rigidly) with the respective inner end 7a of the auxiliary shaft 7.

Even more particularly, in a first practical option each stem 9 is anchored to the lateral surface 8a of the first turn and is supported integrally by the plate 10: in this option, therefore, the screw 8 and the stems 9 rotate monolithically and integrally with the auxiliary shaft 7.

In a second practical option, which does not exhaust the variations that are in any case within the protective scope claimed herein, each stem 9 is coupled rotatably to the lateral surface 8a of the first turn and is supported freely by the plate 10. In this option, therefore, the stems 9 not only are rotated about the longitudinal axis A by the screw 8 and by the plate 10 that support them, but can also rotate about themselves, about the respective main axes B (the stems 9 may simply be left idle or optionally be provided with an independent motor drive).

As a function of the specific type of agricultural material, of the operating conditions, of the acceptable structural complexity, each practical option described above (or others) can be adopted usefully within the scope of the possible ways of carrying out the invention described and claimed herein.

Advantageously, the main axes B (only some of which are shown, for the sake of simplicity, in FIGS. 5, 6 and 7) of the series of stems 9 of one or both of the augers 6 lie on a substantially planar imaginary surface. In practice, as can be deduced clearly by observing FIG. 7 in particular, the centers of the bases of the stems 9 that are directed toward the teeth 5 lie along a straight line.

In this manner, therefore, the series of stems 9 is arranged in alignment and this facilitates the optimum handling of the agricultural products; in any case, the adoption of different arrangements of the stems 9, for example so as to trace an imaginary curved (concave or convex) or polygonal surface, containing the main axes B, is not excluded, without thereby abandoning the protective scope claimed herein.

In an embodiment that is of considerable practical interest and is mentioned by way of nonlimiting example of the application of the invention, the pick-up apparatus 2 comprises a rotating working shaft 11 (FIG. 8), which is arranged parallel to the main shaft 4 (and to the auxiliary shafts 7) and is intended to operate close to the ground.

The working shaft 11 is provided with at least one row of prongs 12 (and preferably with several rows of prongs 12, constituted for example by metal wires of appropriately chosen shape and size). The prongs 12 have the task of lifting from the ground the agricultural products that are progressively encountered during the advancement of the machine 100 and thus deliver them, as a consequence of the rotation of the prongs 12, to the teeth 5 or to the augers 6 (which are indeed arranged behind the apparatus 2 and therefore behind the prongs 12).

For the sake of simplicity, in the accompanying figures the prongs 12 are visible only in FIG. 8: since this is a side view, in this illustration each visible prong 12 actually corresponds to a respective row of prongs 12, which are parallel to the first one and are distributed substantially along the entire longitudinal extension of the working shaft 11.

More particularly, a spacer 13 (for example bent into a U-shape) is arranged rigidly between adjacent pairs of prongs 12 and indeed covers the interspace comprised between adjacent prongs 12 and prevents the forming of tangles of agricultural products, which otherwise might go between the prongs 12 and roll up around the working shaft 11, with evident unpleasant consequences.

The present description (and the protection claimed herein) therefore also relates to the agricultural machine 100 on which the assembly 1 can be mounted. In greater detail, the machine 100 is of the type of balers, rotary balers and the like, and comprises at least one chamber 102 for forming a bale, which is provided with a respective inlet for feeding agricultural products such as grass, hay, forage, wheat, corn and the like. According to the invention, the machine 100 further comprises a unit 1 for conveying the agricultural products that has the particularities described in the preceding paragraphs.

Operation of the unit according to the invention is as follows.

As already anticipated, the machine 100 is intended to travel over ground on which previously cut agricultural products lie, preferably following the ideal trajectory defined by the swaths.

The agricultural products are thus picked up and conveyed by the unit 1 toward the chamber 102, in which the bale is formed on the ground and subsequently deposited on such ground or unloaded into an adapted storage unit.

In greater detail, first of all the apparatus 2 operates within the unit 1 and has the task of lifting the agricultural products by way of the prongs 12, which, while they rotate about the working shaft 11, move upward from below in the portion that lies outside the spacers 13, thus delivering such agricultural products behind them, where the device 3 acts.

Even more particularly, behind the central portion of the apparatus 2 (and of the working shaft 11), the agricultural products moved by the respective prongs 12 are picked up directly by the teeth 5, which convey them to the forming chamber 102 through the respective inlet, which for this purpose is arranged so as to face such teeth 5.

The agricultural products lifted by the prongs 12 that work in the outer portions of the apparatus 2 and of the working shaft 11 are instead affected by the augers 6, which, by rotating, move them transversely with their screws 8, pushing them toward the teeth 5 and therefore again toward the chamber 102.

Indeed at the last portion of each auger 6 (of the respective auxiliary shaft 7), during their movement the agricultural products encounter the stems 9, which despite obviously not contrasting their advancement toward the teeth 5 partially lift them (move them in a radial direction with respect to the auxiliary shaft 7).

The stems 9 therefore achieve the intended aim, since they ensure optimal conveyance of the agricultural products toward the bale forming chamber 102.

This lifting in fact allows to move beyond (skip) the face of the first tooth 5 (if, during rotation, it is located so as to affect the transverse trajectory of the agricultural products), or other elements of the involved components, preventing indeed motion from stopping against them, generating unwanted tangles of hay, grass, or other agricultural products.

The lifting produced by the stems 9 therefore ensures effective ways for conveying the agricultural products toward the chamber 102, avoiding or at least limiting the danger of unwanted accumulations of agricultural products.

It should be noted that typically (but not exclusively) in the portion of trajectory that faces directly the apparatus 2 the teeth 5 move upward from below, and therefore the agricultural products are raised by the teeth 5 and are delivered to the forming chamber 102 by moving above the main shaft 4. Indeed in this configuration it turns out that it is maximally useful to use the stems 9, although their use in units 1 in which the teeth 5 and the stems 9 rotate in an opposite direction is not excluded.

It is fundamental to note that the choice to resort to a plurality of mutually spaced stems 9 gives maximum effectiveness to the lifting action of the agricultural products. They are in fact opposed by a succession of stems 9 and respective interspaces and gaps (empty spaces), and therefore a succession of discontinuities that prevent any slippage toward the auxiliary shaft 7 and, vice versa, offer with the stems 9 abutments against which the products can in practice "rebound" after each interspace or gap, raising rapidly and easily along the series of stems 9, which behave like steps in a sort of staircase.

Finally, it should be noted that this effective result has been achieved with a solution that is structurally simple, can be provided with low costs and is safely reliable.

The invention thus conceived is susceptible of numerous modifications and variations, all of which are within the scope of the appended claims; all the details may further be replaced with other technically equivalent elements.

In the examples of embodiment shown, individual characteristics, given in relation to specific examples, may actually be interchanged with other different characteristics that exist in other exemplary embodiments.

In practice, the materials used, as well as the dimensions, may be any according to requirements and to the state of the art.

The disclosures in European Patent Application No. 16425031.8 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A unit for conveying agricultural products for an agricultural machine (100) of the type of, the unit comprising an apparatus (2) for picking up previously cut agricultural products, and a device (3) for conveying the agricultural products picked up by the apparatus (2) toward an inlet to a chamber (102) of the agricultural machine (100), for forming a bale, the device (3) comprising:
a main rotating shaft (4) facing the apparatus (2) and including a plurality of teeth (5) for transfer of the agricultural products to the chamber (102);
at least one auger (6) including an auxiliary rotating shaft (7) facing the apparatus (2) and contiguous and substantially coaxial to the main shaft (4), and a screw (8) wound around the auxiliary shaft (7) configured to push the agricultural products toward the teeth (5); and
a first series of stems (9), each stem of the first series of stems having a main axis (B) parallel to the auxiliary shaft (7) wherein a respective length of each stem increases progressively with respect to a longitudinal axis (A) defined by the auxiliary shaft (7) and by the main shaft (4), each stem (9) being interposed between a first surface (8a) of the screw (8) and an inner end (7a) of the auxiliary shaft (7), for facilitated movement of the agricultural products propelled by the at least one auger (6) toward the teeth (5).

2. The unit according to claim 1, wherein the device (3) further comprises two of said augers (6) arranged on opposite sides of the main shaft (4) and the teeth (5), each auger of the two augers (6) facing a corresponding external portion of the apparatus (2).

3. The unit according to claim 1, wherein a first stem of the first series of stems (9) closest to the longitudinal axis (A) is spaced from the auxiliary shaft (7) to define an interspace adapted to facilitate movement of the products and to limit a risk of forming tangles.

4. The unit according to claim 1, wherein each stem (9) is spaced from an adjacent stem of the first series of stems (9) to define a corresponding gap adapted to facilitate movement of the products and limit a risk of forming tangles.

5. The unit according to claim 1, wherein a first end of each stem (9) is coupled to the first surface (8a) of the screw (8) directed toward the teeth (5) and a second end of each stem (9) opposite the first end is supported by a contoured plate (10) associated with the inner end (7a) of the auxiliary shaft (7).

6. The unit according to claim 5, wherein each stem (9) is anchored to the first surface (8a) and supported integrally by the contoured plate (10).

7. The unit according to claim 5, wherein each stem (9) is coupled rotatably to the first surface (8a) and supported freely by the contoured plate (10).

8. The unit according to claim 1, wherein the main axis (B) of each stem lies on a substantially planar imaginary surface.

9. The unit according to claim 1, wherein the apparatus (2) further comprises a rotating working shaft (11) arranged parallel to the main shaft (4) and configured to work proximate to the ground, the working shaft (11) being provided with at least one row of prongs (12) configured to lift the agricultural products encountered during advancement of the machine (100) and to deliver the agricultural products to the teeth (5) or to the at least one auger (6).

10. The unit according to claim 9, further comprising a spacer (13) between adjacent prongs of the at least one row of prongs (12) to cover the interspace between the adjacent prongs (12) to prevent forming tangles of agricultural products.

11. An agricultural machine, comprising at least one chamber (102) for forming a bale, provided with a respective inlet for agricultural products, wherein the agricultural machine comprises a unit (1) for conveying agricultural products according to claim 1.

* * * * *